(12) United States Patent
Vogler (10) Patent No.: US 9,849,630 B2
(45) Date of Patent: Dec. 26, 2017

(54) ULTRASONIC PROCESSING DEVICE HAVING A FORCE SENSOR

(71) Applicant: Herrmann Ultraschalltechnik GmbH & Co. KG, Karlsbad (DE)

(72) Inventor: Ulrich Vogler, Uhldingen-Muhlhofen (DE)

(73) Assignee: Herrmann Ultraschalltechnik GmbH & Co. KG, Karlsbad (DE)

( * ) Notice: Subject to any disclaimer, the term of this patent is extended or adjusted under 35 U.S.C. 154(b) by 0 days.

(21) Appl. No.: 15/111,994

(22) PCT Filed: Feb. 18, 2015

(86) PCT No.: PCT/EP2015/053424
§ 371 (c)(1),
(2) Date: Jul. 15, 2016

(87) PCT Pub. No.: WO2015/128236
PCT Pub. Date: Sep. 3, 2015

(65) Prior Publication Data
US 2016/0332364 A1 Nov. 17, 2016

(30) Foreign Application Priority Data
Feb. 28, 2014 (DE) .................. 10 2014 102 685

(51) Int. Cl.
*B32B 37/00* (2006.01)
*B29C 65/00* (2006.01)
(Continued)

(52) U.S. Cl.
CPC ...... *B29C 66/92431* (2013.01); *B23K 20/106* (2013.01); *B29C 65/086* (2013.01);
(Continued)

(58) Field of Classification Search
CPC ........... B29C 66/92431; B29C 66/1122; B29C 66/41; B29C 66/8221; B29C 66/8223;
(Continued)

(56) References Cited

U.S. PATENT DOCUMENTS 3,602,257 A * 8/1971 Berleyoung ............ B29C 65/08
137/594
3,608,809 A * 9/1971 Cushman ............... B23K 20/02
101/287

(Continued)

FOREIGN PATENT DOCUMENTS

DE 4101545 A1 7/1992
DE 19753740 C1 7/1999
(Continued)

OTHER PUBLICATIONS

Nora Lindner, International Preliminary Report on Patentability, PCT/EP2015/053424, International Bureau of the World Intellectual Property Organization, dated Sep. 6, 2016.
(Continued)

Primary Examiner — James Sells
(74) Attorney, Agent, or Firm — Paul & Paul (57) ABSTRACT

The present invention concerns an apparatus for ultrasonic processing of a material web having an ultrasonic vibration unit which has a sonotrode and a converter connected thereto optionally by way of an amplitude transformer, and a counterpart tool, wherein for processing of the material web the web is moved through a gap between the sonotrode and the counterpart tool, wherein the ultrasonic vibration unit is fixed to a carriage moveable relative to the counterpart tool so that the ultrasonic vibration unit can be moved together with the carriage in the force direction, that is to say in the direction of or away from the counterpart tool, wherein there is provided a force sensor for measuring the force applied to the sonotrode by the material web. To (Continued)

provide a corresponding apparatus of the kind set forth in the opening part of this specification, which permits more accurate measurement of the welding force, in order to be able to continuously process by means of ultrasound even situations of use with an extremely small process bandwidth, it is proposed according to the invention that the sonotrode and the carriage are connected together by way of a sensor component which has the force sensor.

20 Claims, 6 Drawing Sheets

(51) Int. Cl.
  *B23K 20/10* (2006.01)
  *B29C 65/08* (2006.01)
(52) U.S. Cl.
  CPC .......... *B29C 66/1122* (2013.01); *B29C 66/41* (2013.01); *B29C 66/8221* (2013.01); *B29C 66/8223* (2013.01); *B29C 66/83411* (2013.01); *B29C 66/92211* (2013.01); *B29C 66/929* (2013.01)
(58) Field of Classification Search
  CPC ......... B29C 66/83411; B29C 66/92211; B29C 65/086; B23K 20/106
  USPC .............................................. 156/358, 580.1
  See application file for complete search history.

(56) References Cited

U.S. PATENT DOCUMENTS

| | | | |
|---|---|---|---|
| 3,886,012 A * | 5/1975 | Slater | ...................... B29C 65/08 156/249 |
| 6,190,296 B1 | 2/2001 | Gnad | |
| 6,508,641 B1 | 1/2003 | Kubik | |
| 6,626,468 B2 * | 9/2003 | Ogawa | ................. B01J 19/0093 285/125.1 |
| 2004/0050474 A1 | 3/2004 | Kubik | |

FOREIGN PATENT DOCUMENTS

| | | |
|---|---|---|
| DE | 19803638 A1 | 8/1999 |
| EP | 0421019 A1 | 4/1991 |
| EP | 0920977 A1 | 6/1999 |
| JP | 2006231698 A | 9/2006 |

OTHER PUBLICATIONS

Tsutomu Iwami, Japanese Patent Office, Japanese Patent Application No. 2016-550586, Office Action, Oct. 31, 2017 and English translation.

* cited by examiner

ULTRASONIC PROCESSING DEVICE HAVING A FORCE SENSOR

CROSS-REFERENCE TO RELEATED APPLICATION

This application is a 371 national stage application of International Application PCT/EP2015/053424, filed Feb. 18, 2015, and claims the priority of German Application No. 10 2014 102 685.3, filed on Feb. 28, 2014.

The present invention concerns an apparatus for ultrasonic processing of a material web.

Such ultrasonic processing apparatuses have an ultrasonic vibration unit comprising a sonotrode, a converter and optionally an amplitude transformer. In that arrangement the converter is possibly connected to the sonotrode by way of the amplitude transformer. The converter converts an electrical ac voltage into a mechanical vibration. The individual elements of the ultrasonic vibration unit are tuned to each other in such a way that the ultrasonic vibration unit has a resonance frequency, the so-called natural frequency, at the desired ultrasonic frequency. If therefore the converter is acted upon with the appropriate ac voltage the ultrasonic vibration unit vibrates at the natural frequency.

In addition there is provided a counterpart tool arranged opposite the sonotrode. For processing the material web the material web is moved through a gap between the sonotrode and the counterpart tool. During the processing operation the sonotrode which is vibrating at the ultrasonic frequency is pressed in the direction of the counterpart tool on to the material web so that the material web is subjected to ultrasonic processing between the sonotrode on the one hand and the counterpart tool on the other hand.

For that purpose it is necessary that the sonotrode and the counterpart tool can be moved relative to each other. Thus for example the gap between the sonotrode and the counterpart tool must be increased to be able to introduce the material web into the gap. The gap is then correspondingly reduced during the processing operation. Therefore the ultrasonic vibration unit is fixed to a carriage moveable relative to the counterpart tool so that the ultrasonic vibration unit can be moved together with the carriage in the force direction, that is to say in the direction of or away from the counterpart tool.

To achieve an optimum processing result it is advantageous if the sonotrode is pressed on to the material web with a predetermined welding force.

Therefore, an apparatus has already been proposed in DE 197 53 740, which has a force sensor for measuring the force applied to the sonotrode by the material web. In that apparatus the carriage is driven by way of a toggle lever system and the sensor is arranged within the toggle lever system.

That apparatus however suffers from the disadvantage that force measurement involves a high level of hysteresis by virtue of frictional forces between the carriage and the carriage guide and within the toggle lever system. In addition transverse forces, that is to say forces which the material web exerts on the sonotrode perpendicularly to the direction of the force cannot be measured with the known arrangement.

There are however situations of use involving a very small process bandwidth. For example it is possible to envisage applications requiring a welding force of 200 N, in which, with a welding force of only 195 N, complete welding no longer occurs, and with a welding force of 205 N, partial damage to the material already takes place.

Those situations of use hitherto cannot be handled by means of continuous ultrasonic processing.

Taking the known state of the art as the basic starting point therefore the object of the present invention is to provide an apparatus of the kind set forth in the opening part of this specification, which permits more accurate measurement of the welding force, in order also to be able to continuously process situations of use involving an extremely small process bandwidth, by means of ultrasound.

According to the invention that object is attained in that the sonotrode and the carriage are connected together by way of a sensor component having the force sensor.

According to the invention therefore the position of the force sensor is displaced by the toggle lever in the direction of the sonotrode, more specifically into a position between the sonotrode and the carriage. At that position the force sensor can directly detect a movement of the sonotrode relative to the counterpart tool, which occurs by virtue of a change in the welding force.

In a preferred embodiment the sonotrode and the carriage are connected together by way of a sensor component having two force sensors. In that case one force sensor is so arranged that the force applied to the sonotrode parallel to the force direction by the material to be processed is measured while the other force sensor is so arranged that the force applied to the sonotrode perpendicularly to the force direction by the material to be processed is measured.

By virtue of the positioning of the sensor component in the immediate proximity of the sonotrode it is even possible to measure both the force parallel to the force direction and also the force perpendicular to the force direction by means of two force sensors. It will be appreciated that more than two force sensors can also be used.

In a preferred embodiment there is provided a drive for moving the carriage parallel to the force direction, wherein preferably the drive is connected to the carriage by way of a force deflection system like for example a toggle lever system. Such an arrangement can be found for example in above-mentioned DE 197 53 740 C1. In that case the carriage is so positioned in a guide that it can be moved relative to the machine support structure only in the force direction but not perpendicularly thereto.

In a particularly preferred embodiment the sensor component comprises two plate elements connected together by way of at least two elastic connecting elements, wherein one plate element is connected to the ultrasonic vibration unit and the other plate element is connected to the carriage. In that case the force sensor is best fixed to a connecting element.

A particularly preferred embodiment is one in which the one connecting element is arranged closer to the counterpart tool than the other connecting element, wherein then preferably there are provided two force sensors and one force sensor is positioned on the connecting element which is arranged further away from the counterpart tool in such a way that the force applied to the sonotrode parallel to the force direction by the material to be processed is measured and the other force sensor is positioned on the connecting element which is arranged closer to the counterpart tool in such a way that the force applied to the sonotrode perpendicularly to the force direction by the material to be processed is measured.

The connecting elements can be for example in the form of elastic connecting arms which connect the two plate elements together so that, in the event of a force exerted on the sonotrode by the material web, a relative movement of the two plate elements takes place, with the connecting elements being deformed.

In a further preferred embodiment it is provided that at least four connecting elements connect the plate elements together, wherein two respective connecting elements are equally spaced from the counterpart tool. More stability is imparted to the sensor plate and thus the connection between the sonotrode and the carriage by virtue of the paired arrangement of the connecting elements.

In a preferred embodiment the two plate elements are arranged parallel to each other, wherein they are preferably arranged in mutually displaced relationship in a direction perpendicular to the plate plane and best a plate element has an opening in which the other plate element is arranged.

In that case the opening can in principle be of any desired configuration. Thus for example an O-shaped opening is conceivable, that is to say an outer plate element surrounds over its entire periphery the inner plate element which is arranged within the O-shaped opening. Instead however it would also be possible to envisage a U-shaped opening in which the outer plate element surrounds the inner plate element only at three sides, or an L-shaped opening in which the outer plate element surrounds the inner plate element only at two sides.

To achieve a good welding result, in principle a high level of rigidity in the connection between the sonotrode and the machine support structure is necessary. However the arrangement according to the invention of the sensor plate requires a certain mobility as it is only then that the force can be measured. It has been found that the mobility of the two plate elements relative to each other both in the force direction and also in a direction perpendicular to the force direction should be less than 20 μm/kN, preferably less than 10 μm/kN and best less than 3 μm/kN.

In a preferred embodiment the force sensor can have a strain gauge which measures the deformation of the connecting elements and allows therefrom conclusions about the force exerted on the sonotrode by the material web.

In a further preferred embodiment the force sensor is a piezoelectric sensor.

As the rigidity of piezoelectric sensors is greater by a factor of between 70 and 100 in comparison with the force sensors based on strain gauges, the mobility of the two plate elements relative to each other can be still further reduced at least in the force direction, by virtue of using a piezoelectric sensor as the force sensor.

Therefore the elasticity of the system can be considerably reduced solely by using piezoelectric sensors as the force sensor.

Piezoelectric sensors however have the problem that, by virtue of the structure of the piezoelectric sensors or the use linked thereto of a charge amplifier for measuring the charge provided by the piezoelectric crystal a discharge always occurs, so that the charge measured by the charge amplifier, which is converted into an electrical voltage, decreases in respect of static measurements.

In order therefore to improve the measurement results of the piezoelectric sensor in a preferred embodiment there can be provided a control device which either short-circuits the piezoelectric sensor when the ultrasonic processing system is not performing any material processing operation, or adds a force compensation value which varies in respect of time to the force measured by the piezoelectric sensor.

Thus it is possible for example to sometimes short-circuit the piezoelectric sensor, more specifically at a moment at which the sonotrode is not in engagement with the material, that is to say at a moment at which no welding is occurring. At that moment the sonotrode is exerting no or only a low force on the material webs. The piezoelectric sensor is so-to-speak zeroed by the short-circuiting operation so that, after the short-circuiting process, only changes in force can be measured.

As the piezoelectric sensor is now not based on a strain gauge it is preferably also not fixed to the connecting elements. For example the piezoelectric sensor can be fixed to the two plate elements of the sensor plate so that the force which the one plate element exerts on the other plate element is detected. In that case the piezoelectric sensor is so connected to the two plate elements that the major part of the flow of force is diverted by way of the piezoelectric sensor.

In a further preferred embodiment it is provided that the piezoelectric sensor is biased in such a way that the piezoelectric sensor measures a force even when no force is exerted on the sonotrode by the material web.

That can be effected for example by the piezoelectric sensor being pressed on to the second plate element by means of screws which engage through corresponding threaded through bores in the first plate element. In that way, in any case a force is exerted on the piezoelectric sensor. That can be advantageous in particular when post-vibrations of the sonotrode occur as then not only compressive but also tensile forces occur at the piezoelectric sensor. "Negative forces" can now also be measured by virtue of the corresponding biasing.

In a preferred embodiment the piezoelectric sensor is so arranged on the sensor component that the force applied to the sonotrode parallel to the force direction by the material to be processed is measured.

It will be appreciated that it is also possible for the force applied to the sonotrode perpendicularly to the force direction by the material to be processed to be measured. That can be effected for example by means of a second sensor. In this case however it has been found that, for the sensor which is used to measure the force applied to the sonotrode perpendicularly to the force direction by the material to be processed, preferably a strain gauge is employed, which is positioned on the connecting element and more specifically preferably on the connecting element arranged closer to the counterpart tool.

Figure 1:
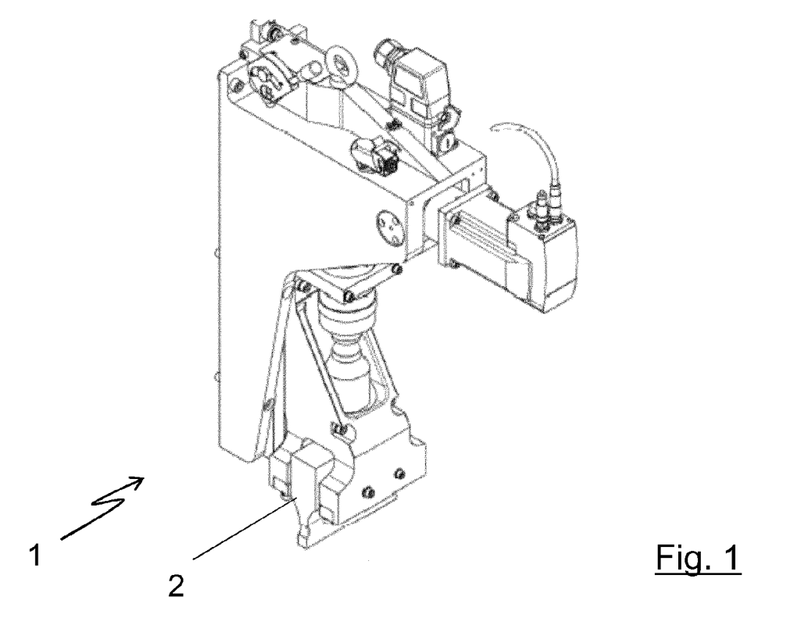
FIG. 1 shows a perspective view of an embodiment according to the invention.

Further advantages of the present invention will be apparent from the description hereinafter of a preferred embodiment and the accompanying Figures in which:

FIG. 1 shows a perspective view of a processing apparatus 1 according to the invention.

Figure 2:
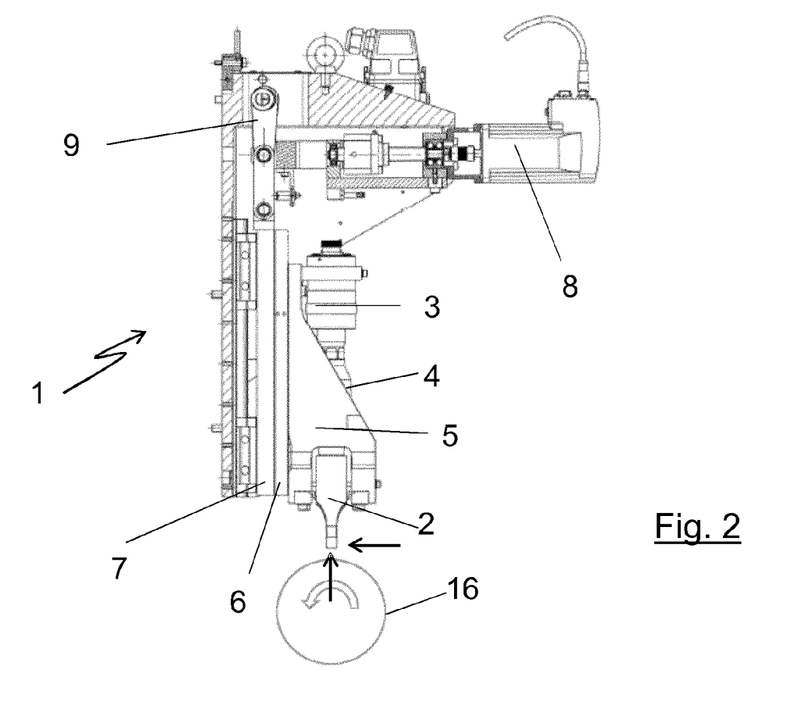
FIG. 2 shows a sectional view of the embodiment of FIG. 1.

FIG. 2 shows a locally sectioned side view of FIG. 1. The apparatus has a sonotrode 2 connected to the converter 3 by way of an amplitude transformer 4. The ultrasonic vibration unit comprising the sonotrode 2, the amplitude transformer 4 and the converter 3 is fixed in a holder 5. The holder 5 is in turn fixed to a carriage 7 by way of the sensor component 6 which is in the form of a sensor plate. The carriage 7 can be moved in a vertical direction relative to the machine support structure. For that purpose the carriage 7 is connected to a drive motor 8 by way of a toggle lever mechanism 9.

The drive motor 8 moves the threaded rod which is connected thereto and which in turn leads by way of the toggle lever mechanism 9 to a vertical movement of the carriage 7.

FIG. 2 diagrammatically shows a counterpart tool 16 in roller form. The material web or webs are passed through between the sonotrode 2 and the counterpart tool 16 which rotates about its axis, for the processing operation. In that case the material to be processed exerts on the sonotrode 2 both a force in the force direction, the actual welding force, and also a force transversely relative to the force direction which is caused substantially by the forward movement of the material through the gap between the sonotrode 2 and the counterpart tool 16, as shown by the arrows in FIG. 2.

According to the invention a force sensor is provided within the sensor plate 6.

Figure 3:
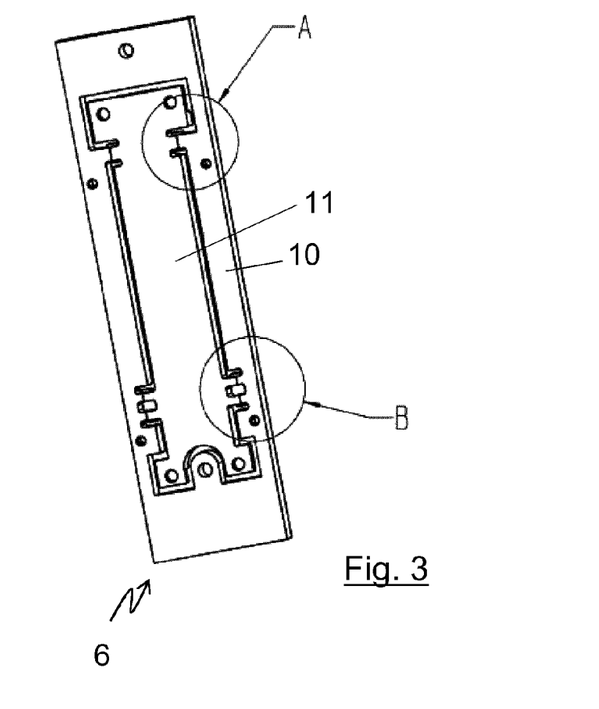
FIGS. 3, 3a and 3b show a perspective view and enlarged detail views of a sensor component as is used in the embodiment shown in FIGS. 1 and 2.
Figure 3A:
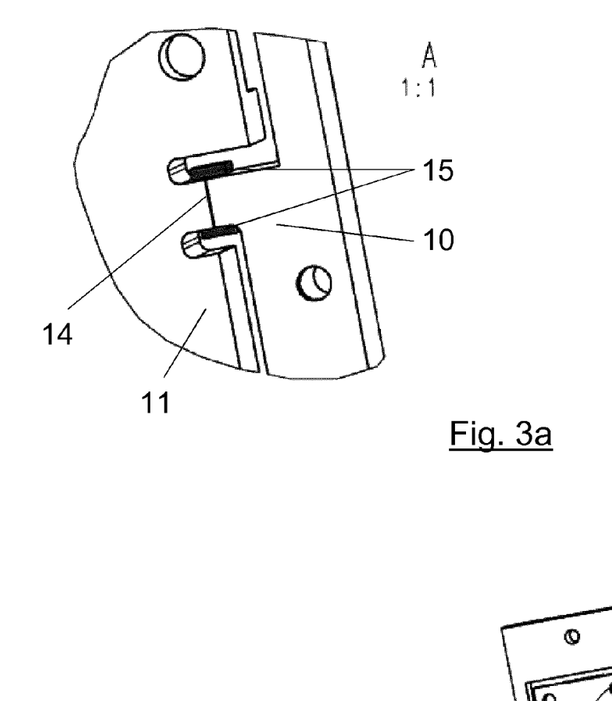
Figure 3B:
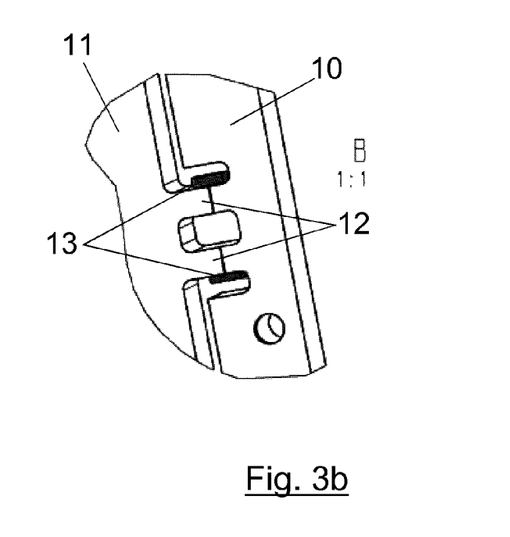

The sensor plate is shown in FIGS. 3, 3a and 3b in a perspective view and in two detail views. The sensor plate 6 comprises an outer plate element 10 and an inner plate element 11. The two plate elements are arranged almost in one plane so that the outer plate element 10 substantially completely surrounds the inner plate element 11.

Both the inner and also the outer plate elements 10, 11 have fixing holes. One of the two plate elements, for example the inner plate element 11, is fixed to the carriage 7 while the other plate element, for example the outer plate element 10, is fixed to the holder 5. The two plate elements 10, 11 are connected together by way of connecting elements 13, 14.

It will be noted however that in the illustrated embodiment the two plate elements are arranged in slightly mutually displaced relationship, that is to say they are not disposed exactly in one plane. Such a configuration permits a fixing to carriage and sonotrode, that ensures that any force transmission caused by the force of the material web is effected solely and simply by way of the connecting elements 12, 14.

FIG. 3a shows an enlarged view of the detail A of FIG. 3. Shown therein is the connecting element 14 connecting the inner plate element 11 to the outer plate element 10. In addition two force sensors in the form of strain gauges 15 are here arranged on that connecting element 14.

FIG. 3b is a view of the detail B in FIG. 3. It will be seen here that two connecting elements 12 connect the inner plate element 11 to the outer plate element 10. Here too force sensors 13 are associated with each connecting element 12. The sensor component is of a substantially mirror-symmetrical configuration relative to a longitudinal axis, that is to say there are two pairs of connecting elements, as are shown in FIG. 3b, and two oppositely disposed connecting elements 14 like one shown in FIG. 3a.

Figure 4:
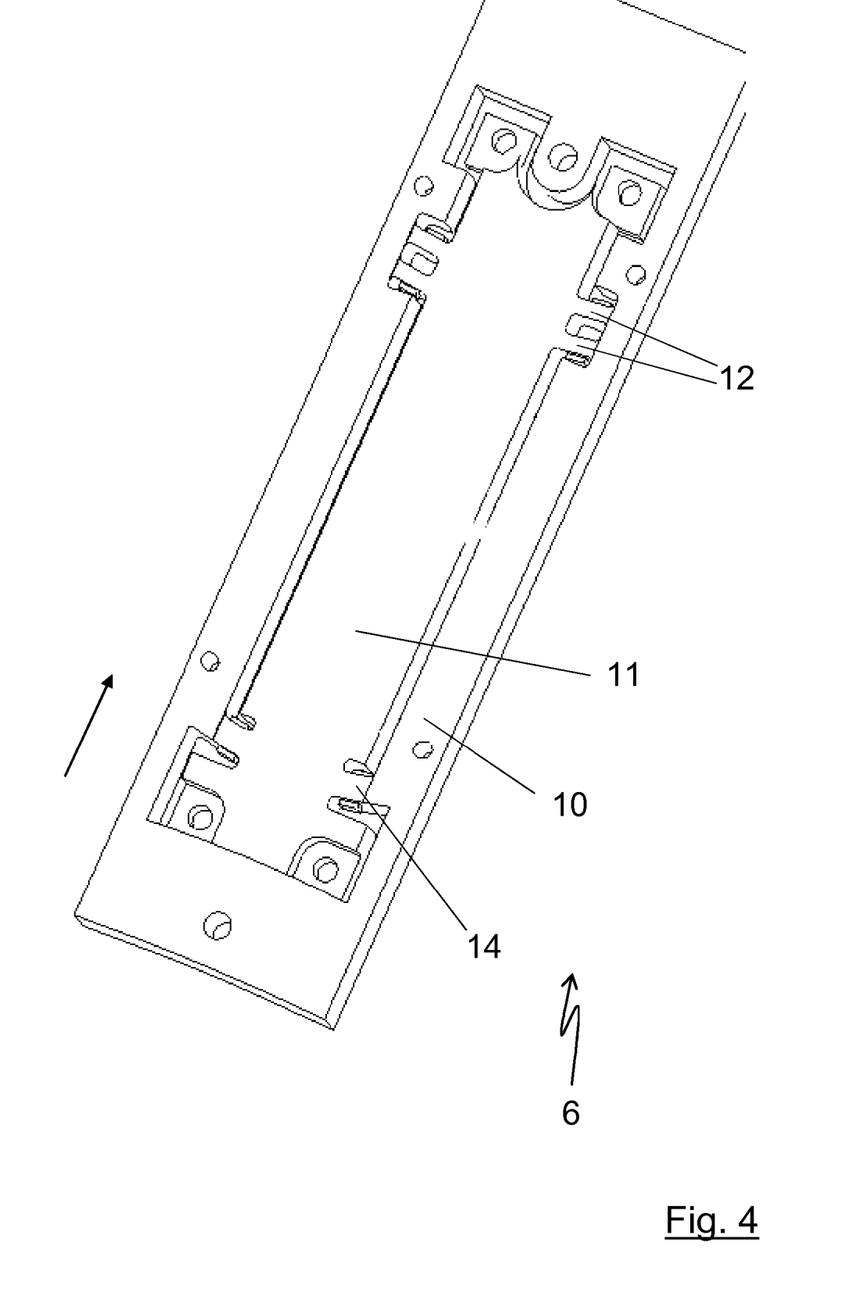
FIG. 4 shows a perspective view of the sensor component of FIG. 4 during deformation in the longitudinal direction.

FIG. 4 shows a diagrammatic view of the sensor plate 6 which represents the situation in relation to a force applied to the sonotrode in the longitudinal direction or the force direction. That direction is identified by an arrow in the Figure. If a force acting in the longitudinal direction is applied to a sonotrode 2 by the material web then that, by virtue of the connection between the sonotrode 2 or holder 5 and the outer plate element 10, results in deformation of the connecting elements 12, 14. The inner plate element 11 is connected to the fixedly positioned carriage 7. It will be seen in particular in the region of the connecting elements 14 that those connecting elements which are in the form of arms are deformed. That deformation can be measured by means of the force sensors 15 arranged on the connecting elements 14.

Figure 5:
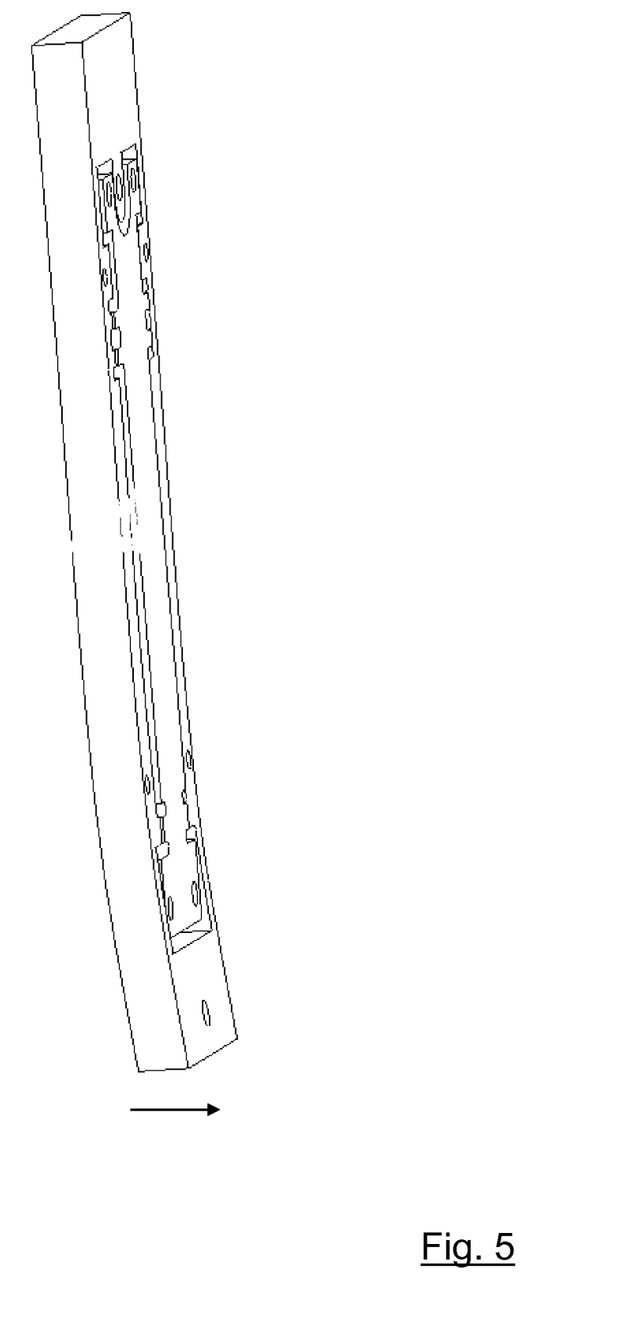
FIG. 5 shows a perspective view of the sensor component of FIG. 3 during deformation by a transverse force.

FIG. 5 shows the situation which occurs when a force acting perpendicularly to the force direction is applied to the sonotrode. That direction is identified by an arrow in the Figure.

As the sonotrode 2 is connected to the outer plate element 10 by way of the holder 5 while the inner plate element 11 is connected to the carriage 7 a force perpendicularly to the force direction on the sonotrode leads to the deformation shown in FIG. 5. That occurs substantially in the lower region, that is to say in the region of the connecting elements 14 as it is there that the greatest force transmission occurs, by virtue of the lever action. Thus, substantially transverse forces can be measured with the force sensors 15 fixed to the connecting elements 14 while forces acting substantially in the force direction can be measured by means of the force sensors 13 fixed to the connecting elements 12.

Figure 6:
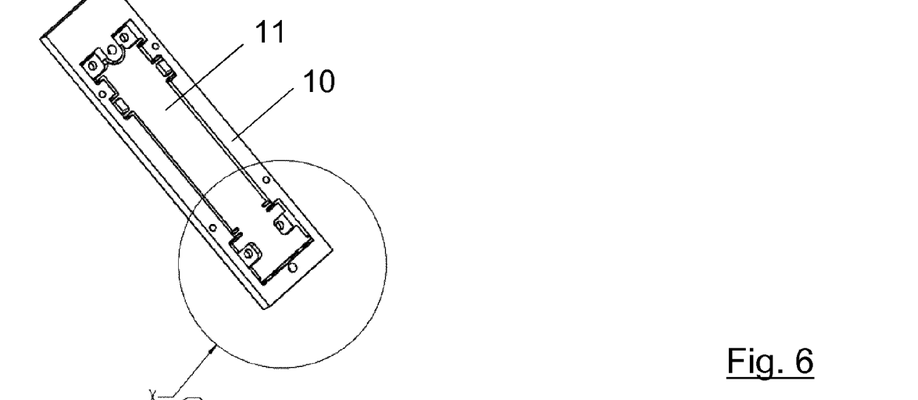
FIGS. 6 and 6a show a plan view and an enlarged partial view of a second embodiment according to the invention.
Figure 6A:
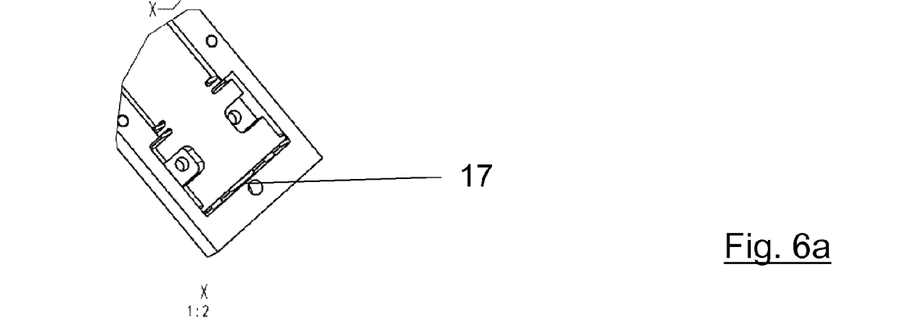
Figure 7:
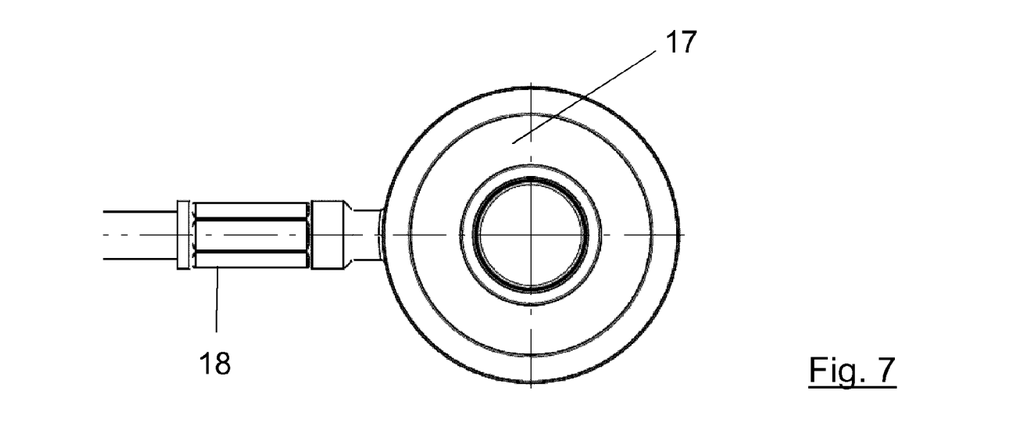
FIG. 7 shows a plan view of a piezoelectric sensor.

FIGS. 6 through 9 show a second embodiment according to the invention, in which a piezoelectric sensor 17 is used as the force sensor. FIG. 6 shows a plan view of this embodiment. Here too the sensor plate has two plate elements 10, 11. It will be seen from the partial view shown on an enlarged scale in FIG. 6a that a piezoelectric sensor 17 is arranged in the longitudinal direction of the sensor plate between the inner plate element 11 and the outer plate element 10. The piezoelectric sensor 17 is diagrammatically shown in FIG. 7. It comprises appropriate piezoelectric discs and a connection 18, by way of which the charge generated by the piezoelectric crystals can be measured.

Figure 8:
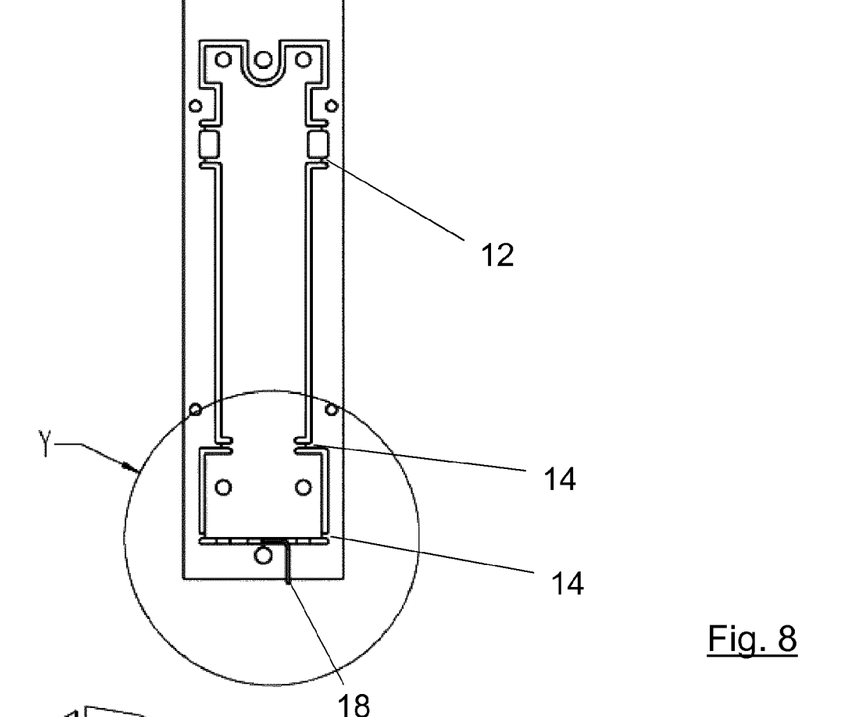
FIGS. 8 and 8a show a rear view and an enlarged partial view of the second embodiment according to the invention.
Figures 8A, 9:
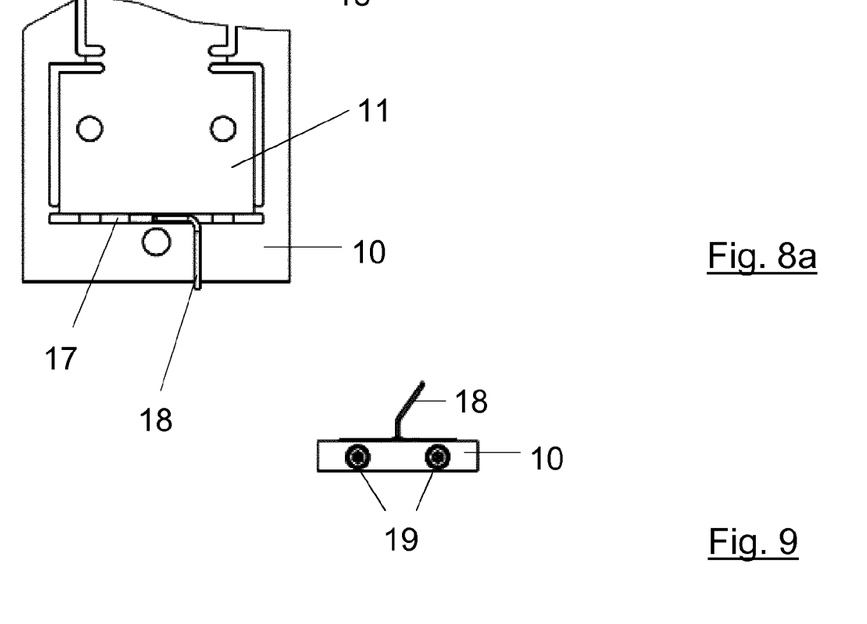
FIG. 9 shows a side view of the second embodiment according to the invention.

FIGS. 8 and 8a show a rear view of the embodiment. It will be seen here that the connection 18 is passed along the outer plate element 10. The inner plate element is fixed to the outer plate element 10 by means of solid-state hinges 12, 14. The hinges or connecting portions provide for stability in respect of shape. In particular in the force direction however the arrangement ensures that the predominant part of the flow of force is by way of the piezoelectric sensor.

Finally FIG. 9 shows a view from below. It is possible to see here two screws 19 guided in corresponding threaded through bores in the outer plate element 10. They engage through the outer plate element 10 and press the piezoelectric sensor 17 against the inner plate element 11, thereby ensuring that a force is always exerted on the piezoelectric sensor.

The piezoelectric sensor has to be calibrated after fitment of the sensor.

LIST OF REFERENCES 1 processing apparatus
2 sonotrode
3 converter
4 amplitude transformer
5 holder
6 sensor plate/sensor component
7 carriage
8 drive motor
9 toggle lever mechanism 10 outer plate element
11 inner plate element
12, 14 connecting element
13, 15 force sensors
16 counterpart tool
17 piezoelectric sensor
18 connection
19 screw

The invention claimed is:

1. Apparatus for ultrasonic processing of a material web having an ultrasonic vibration unit which has a sonotrode and a converter connected thereto, and a counterpart tool, wherein for processing of the material web the web is moved through a gap between the sonotrode and the counterpart tool, wherein the ultrasonic vibration unit is fixed to a carriage moveable relative to the counterpart tool so that the ultrasonic vibration unit can be moved together with the carriage in the force direction, that is to say in the direction of or away from the counterpart tool, wherein there is provided a force sensor for measuring the force applied to the sonotrode by the material web, wherein the sonotrode and the carriage are connected together by way of a sensor component which has the force sensor, characterised in that the sensor component comprises two plate elements connected together by way of at least two connecting elements, wherein one plate element is connected to the ultrasonic vibration unit and the other plate element is connected to the carriage, wherein the at least one force sensor is fixed to a connecting element.

2. Apparatus as set forth in claim 1 characterised in that the sonotrode and the carriage are connected together by way of a sensor component having two force sensors, wherein one force sensor is so arranged that the force applied to the sonotrode parallel to the force direction by the material to be processed is measured and the other force sensor is so arranged that the force applied to the sonotrode perpendicularly to the force direction by the material to be processed is measured.

3. Apparatus as set forth in claim 1 characterised in that there is provided a drive for moving the carriage parallel to the force direction.

4. Apparatus as set forth in claim 1 characterised in that the one connecting element is arranged closer to the counterpart tool than the other connecting element.

5. Apparatus as set forth in claim 4 characterised in that there are provided at least 4 connecting elements, by way of which the plate elements are connected together, wherein 2 respective connecting elements are equally spaced from the counterpart tool.

6. Apparatus as set forth in claim 4 characterised in that the two plate elements are arranged substantially in the same plane.

7. Apparatus as set forth in claim 1 characterised in that the force sensor has a strain gauge.

8. Apparatus as set forth in claim 4 characterised in that the mobility of the two plate elements relative to each other both in the force direction and also in a direction perpendicularly to the force direction is less than 20 µm/kN.

9. Apparatus as set forth in claim 1 characterised in that the force sensor is a piezoelectric sensor.

10. Apparatus as set forth in claim 4 wherein the force sensor is a piezoelectric sensor characterised in that the piezoelectric sensor is fixed to both plate elements so that the force which the one plate element exerts on the other plate element is detected.

11. Apparatus as set forth in claim 9 characterised in that the piezoelectric sensor is arranged on the sensor component in such a way that the force applied to the sonotrode parallel to the force direction by the material to be processed is measured.

12. Apparatus as set forth in claim 10 characterised in that there are provided a first force sensor and a second force sensor, wherein the first force sensor is a piezoelectric sensor which is so fixed to the sensor plate that the force applied to the sonotrode parallel to the force direction by the material to be processed is measured and the second force sensor is so positioned on a connecting element.

13. Apparatus as set forth in claim 3 wherein the drive is connected to the carriage by way of a force deflection system.

14. Apparatus as set forth in claim 3 wherein preferably the drive is connected to the carriage by way of a toggle lever system.

15. Apparatus as set forth in claim 4 wherein there are provided a first and a second force sensor and the first force sensor is positioned on the connecting element which is arranged further away from the counterpart tool in such a way that the force applied to the sonotrode parallel to the force direction by the material being processed is measured and the second force sensor is positioned on the connecting element which is arranged closer to the counterpart tool in such a way that the force applied to the sonotrode perpendicularly to the force direction by the material to be processed is measured.

16. Apparatus as set forth in claim 6 wherein one plate element has an opening in which the other plate element is arranged.

17. Apparatus as set forth in claim 7 characterised in that the mobility of the two plate elements relative to each other, both in the force direction and also in a direction perpendicular to the force direction, is less than 10 µm/kN.

18. Apparatus as set forth in claim 7 characterised in that the mobility of the two plate elements relative to each other, both in the force direction and also in a direction perpendicular to the force direction, is less than 3 µm/kN.

19. Apparatus as set forth in claim 10 wherein the piezoelectric sensor is biased in such a way that the piezoelectric sensor measures a force even when no force is exerted on the sonotrode by the material web.

20. Apparatus as set forth in claim 12 wherein the second force sensor has strain gauges and is positioned on a connecting element which is arranged closer to the counterpart tool so that the force applied to the sonotrode perpendicularly to the force direction by the material to be processed is measured.

* * * * *